US007706602B2

(12) United States Patent
Nakashima

(10) Patent No.: US 7,706,602 B2
(45) Date of Patent: Apr. 27, 2010

(54) GENERATING A THREE-DIMENSIONAL MODEL FROM A STANDARD MODEL AND MULTIPLE TWO-DIMENSIONAL IMAGES

(75) Inventor: Akiko Nakashima, Adachi-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1059 days.

(21) Appl. No.: 11/369,126

(22) Filed: Mar. 6, 2006

(65) Prior Publication Data

US 2006/0210148 A1 Sep. 21, 2006

(30) Foreign Application Priority Data

Mar. 7, 2005 (JP) .............................. 2005-062653

(51) Int. Cl.
G06K 9/00 (2006.01)
G06K 9/36 (2006.01)
G06T 15/00 (2006.01)

(52) U.S. Cl. ......................... 382/154; 382/285; 345/419

(58) Field of Classification Search ................. 382/154, 382/285; 345/419–422, 427
See application file for complete search history.

(56) References Cited

U.S. PATENT DOCUMENTS

| 6,002,782 | A  | * | 12/1999 | Dionysian | .................... | 382/118 |
| 6,047,078 | A  |   | 4/2000 | Kang | | |
| 6,434,278 | B1 | * | 8/2002 | Hashimoto | ................... | 382/285 |
| 6,556,704 | B1 | * | 4/2003 | Chen | .......................... | 382/154 |
| 2002/0106114 | A1 | * | 8/2002 | Yan et al. | .................... | 382/118 |
| 2005/0031195 | A1 | * | 2/2005 | Liu | ............................. | 382/154 |
| 2007/0031001 | A1 | * | 2/2007 | Hamanaka | ................... | 382/103 |
| 2009/0052748 | A1 | * | 2/2009 | Jiang et al. | .................. | 382/118 |

FOREIGN PATENT DOCUMENTS

| JP | 04-289976 | | 10/1992 |
| JP | 07-093561 | * | 4/1995 |

(Continued)

OTHER PUBLICATIONS

Fua et al. (Jun. 1998) "From regular images to animated heads: a least squares approach." LNCS vol. 1406, pp. 188-202.*
Japanese Office Action dated Mar. 28, 2008 corresponding to U.S. Appl. No. 11/369,126, filed Mar. 6, 2006.
Japanese Office Action dated Jul. 8, 2008 corresponding to U.S. Appl. No. 11/369,126, filed Mar. 6, 2006.

(Continued)

*Primary Examiner*—Bhavesh M Mehta
*Assistant Examiner*—Barry Drennan
(74) *Attorney, Agent, or Firm*—Turocy & Watson, LLP

(57) ABSTRACT

An apparatus for generating a three-dimensional model of an object includes a storage unit that stores three-dimensional coordinates of plural vertices on a standard model of the object, an image input unit that inputs plural input images acquired by photographing the object, a first detection unit that detects a coordinate of a first point corresponding to a vertex on the standard model, from a first image selected from among the plural input images, a second detection unit that detects a coordinate of a second point corresponding to the coordinate of the first point, from a second image other than the first image, a depth computation unit that computes a depth of the first point by using the coordinates of the first and second points, and a first update unit that updates the three-dimensional coordinate on the standard model based on the coordinate of the first point and the calculated depth.

7 Claims, 9 Drawing Sheets

FOREIGN PATENT DOCUMENTS

| | | |
|---|---|---|
| JP | 2787612 | 6/1998 |
| JP | 2002-015310 | 1/2002 |
| JP | 2002-063567 | 2/2002 |
| JP | 2003-141552 | 5/2003 |
| JP | 3490482 | 11/2003 |

OTHER PUBLICATIONS

Oonishi, Surface Interpolation by a Spline Technique, Journal of the Oceanographical Society of Japan, vol. 31, pp. 259-264, 1975 Japan.

* cited by examiner

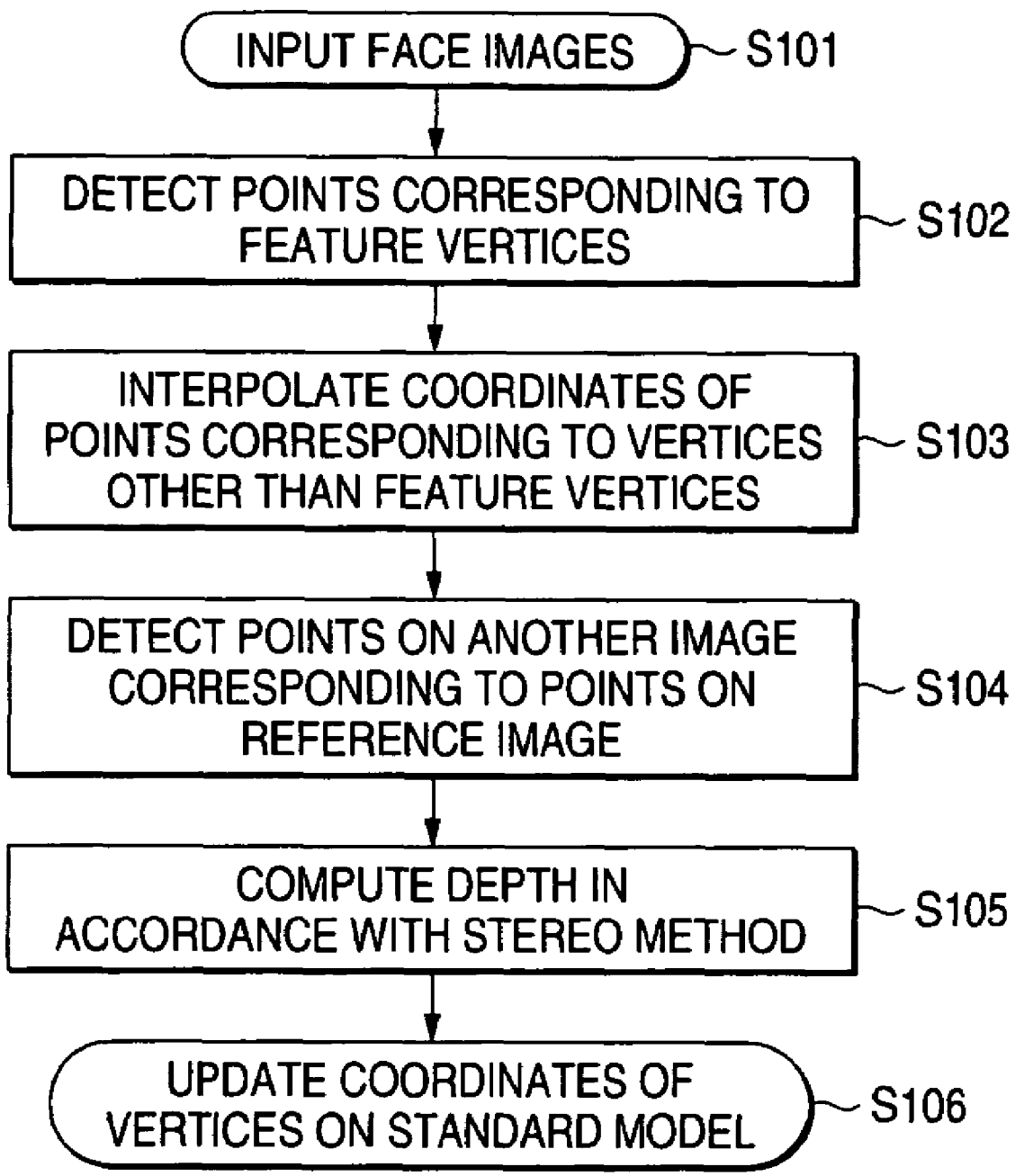

FIG. 5
REFERENCE IMAGE
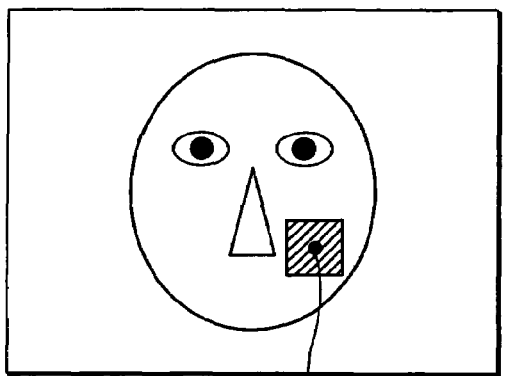
(x, y)
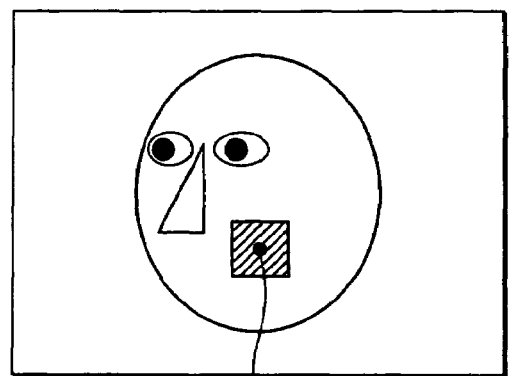
(x', y')

GENERATING A THREE-DIMENSIONAL MODEL FROM A STANDARD MODEL AND MULTIPLE TWO-DIMENSIONAL IMAGES

CROSS REFERENCE TO RELATED APPLICATIONS

The present application is based upon and claims the benefit of priority from the prior Japanese Patent Application No. 2005-062653, filed on Mar. 7, 2005; the entire contents of which are incorporated herein by reference.

BACKGROUND OF THE INVENTION

1. Field of the Invention

The present invention relates to a three-dimensional model generating apparatus method and program, which are arranged to enable generation of a highly-accurate three-dimensional model of a subject.

2. Description of the Related Art

A lot of methods for generating a three-dimensional model of a subject from images acquired by photographing the subject have been proposed.

Particularly, in a widely-used method, three-dimensional points (herein after called as "vertices" in order to distinguish those from two-dimensional points) set on the surface of a previously-prepared standard model of a subject are associated with points on a photographed image, and corrections are made on coordinates of the vertices on the standard model in accordance with the association, thereby generating a three-dimensional model of the subject. According to this method, in the case of generation of a three-dimensional model of, e.g., a face, so long as eyes, nasal cavities, and the like, vertices on the standard model of the face are indexed, indices of vertices on the thus-generated three-dimensional model are common with those on the standard model at all times. Therefore, we can easily know a particular vertices, such as eyes or nasal cavities. That is a merit of this method using on the standard model.

One of face image model generating apparatuses mentioned, above is Japanese Patent No. 2,787,612 (pg. 2 and FIG. 2). In order to correct coordinates of vertices, this generating apparatus detects a center line of a face from an image acquired by photographing the face of a person from the front, detects a contour line of the face from the image acquired by photographing the face of the person from the side, detects points on the image corresponding to vertices on a standard model in view of the relationship between the center line and the contour line, and calculate the depths of the detected points.

Vertices on the standard model to which corresponding points are not detected are interpolated in a three-dimensional space. Therefore, depths of interpolated vertices on the thus-generated model is magnified not always accurate, thereby resulting in a failure to obtain a geometrically-accurate three-dimensional model.

As mentioned previously, according to the related art, the points on the image and the vertices on the standard model are associated with each other in the three-dimensional space. Hence, the discrepancy between the thus-generated model and the geometry of the actual subject is magnified, thereby yielding a problem of a failure to obtain a three-dimensional model of accurate geometry.

The present invention is conceived to solve the drawbacks of the related art and aims at providing a three-dimensional model generating apparatus, a three-dimensional model generating method, and a three-dimensional model generating program, which enable generation of a highly-accurate three-dimensional model of a subject.

SUMMARY OF THE INVENTION

According to an aspect of the present invention, an apparatus for generating a three-dimensional model of an object, includes a storage unit that stores three-dimensional coordinates (X,Y,Z) of a plurality of vertices on a standard model of the object, an image input unit that inputs a plurality of input images acquired by photographing the object, a first detection unit that detects a coordinate (x,y) of a first point corresponding to a vertex on the standard model, from a first image selected from among the plurality of input images, a second detection unit that detects a coordinate (x',y') of a second point corresponding to the coordinate of the first point on the first image, from a second image other than the first image, input by the image input unit, a depth computation unit that computes a depth of the first point on the first image by using the coordinate (x,y) of the first point on the first image and the coordinate (x',y') of the second point on the second image, and a first update unit that updates the three-dimensional coordinate (X,Y,Z) on the standard model based on the coordinate (x,y) of the first point on the first image and the depth calculated by the depth calculation unit.

According to another aspect of the present invention, a method for generating a three-dimensional model of an object includes an image input step of inputting a plurality of input images acquired by photographing the object, a first detection step of detecting a coordinate (x,y) of a first point corresponding to a vertex on a standard model, from a first image selected from among the plurality of input images, a second detection step of detecting a coordinate (x',y') of a second point corresponding to the coordinate of the first point on the first image, from a second image other than the first image, input in the image input step, a depth computation step of computing a depth of the first point on the first image by using the coordinate (x,y) of the first point on the first image and the coordinate (x',y') of the second point on the second image, and a first update step of updating the three-dimensional coordinate (X,Y,Z) of the standard model based on the coordinate (x,y) of the first point on the first image and the depth calculated in the depth computation step.

According to another aspect of the present invention, a computer readable medium storing a program to make a computer perform generating a three-dimensional model of an object, the program includes an image input step of inputting a plurality of input images acquired by photographing the object, a first detection step of detecting a coordinate (x,y) of a first point corresponding to a vertex on a standard model, from a first image selected from among the plurality of input images, a second detection step of detecting a coordinate (x',y') of a second point corresponding to the coordinate of the first point on the first image, from a second image other than the first image, input in the image input step, a depth computation step of computes a depth of the first point on the first image by using the coordinate (x,y) of the first point on the first image and the coordinate (x',y') of the second point on the second image, and an update step of updating the three-dimensional coordinate (X,Y,Z) of the standard model on based on the coordinates (x,y) of the first point on the first image and the depth calculated in the depth computation step.

According to the present invention, generation of a highly-accurate three-dimensional model of an object becomes possible, and hence the present invention can be utilized for highly-accurate authentication of a person, authentication of an object, or tracking of an object.

BRIEF DESCRIPTION OF THE DRAWINGS

FIG. 2 is a flowchart showing operation of the three-dimensional model generating apparatus of the first embodiment of the present invention;

FIG. 5 is a view showing an example method for searching points on a reference image and those on another image, which are corresponding to each other, according to the first embodiment of the present invention;

DETAILED DESCRIPTION OF THE INVENTION

Embodiments of the present invention will be described hereinbelow.

First Embodiment

Figure 1:
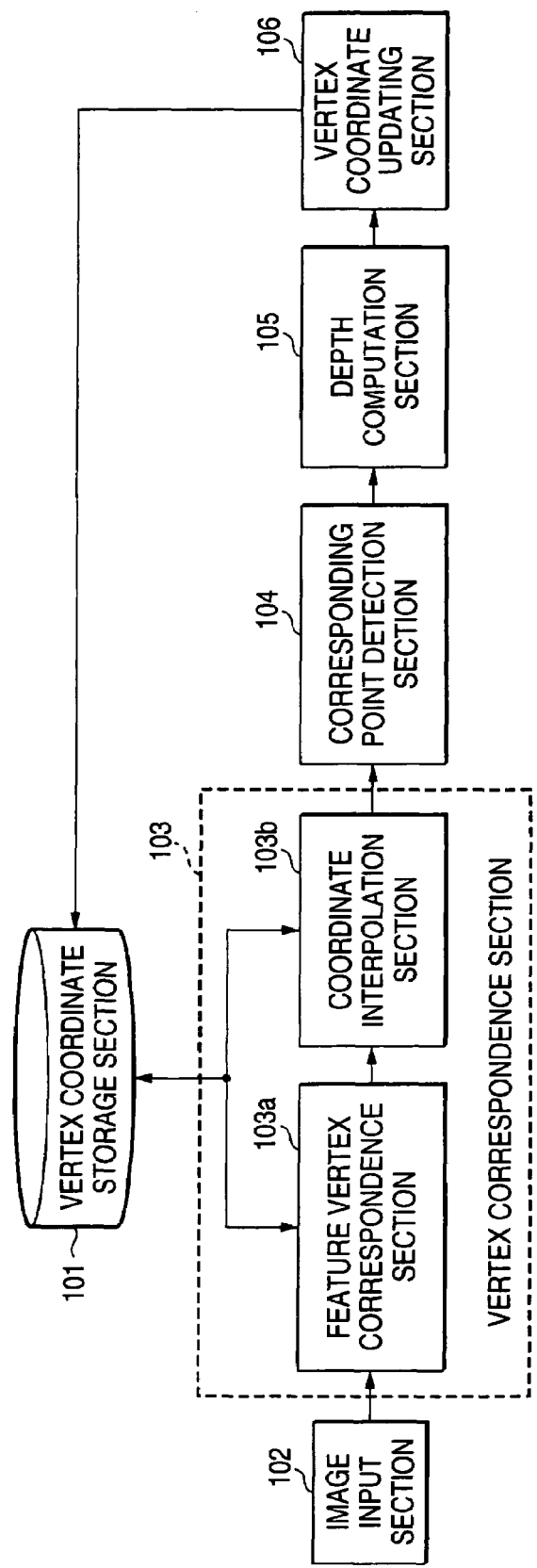
FIG. 1 is a block diagram showing the configuration of a three-dimensional model generating apparatus according to a first embodiment of the present invention.

FIG. 1 is a block diagram showing a three-dimensional model generating apparatus according to a first embodiment of the present invention. In the present embodiment, an object which is a subject of generation of a three-dimensional model is assumed to be a human face.

The three-dimensional model generating apparatus according to the first embodiment comprises a vertex coordinate storage section 101 for storing a standard model of a human face along with three-dimensional coordinates (X,Y,Z) of vertices on the standard model; an image input section 102 for inputting a plurality of images acquired by photographing a human face whose three-dimensional model is to be generated; a vertex correspondence section 103 for detecting coordinates (x,y) of points, which correspond to the vertices on the standard model stored in the vertex coordinate storage section 101, on a reference image selected from the images input by the image input section 102; a corresponding-point detection section 104 for detecting, from an image other than the reference image, input by the image input section 102, coordinates (x',y') of the points corresponding to the points on the reference image detected by the vertex correspondence section 103; a depth computation section 105 for computing the depth of a point on the reference image from the coordinates (x,y) of the point on the reference image detected by the vertex correspondence section 103 and the coordinates (x',y') of the point corresponding to another image detected by the corresponding point detection section 104; and a vertex coordinate update section 106 for updating the coordinates (x,y,z) of vertices on the standard model of the subject on the basis of the depth of the point on the reference image computed by the depth computation section 105.

The vertex correspondence section 103 comprises a feature vertex correspondence section 103a for detecting, from the reference image, coordinates (x,y) of a point corresponding to a predetermined characteristic vertex (called as a feature vertex) among the vertices stored in the vertex coordinate storage section 101; and a coordinate interpolation section 103b for determining, through interpolation, coordinates (x,y) of a point corresponding to a vertex other than the feature vertex from the coordinates (x,y) of the point on the reference image detected by the feature vertex correspondence section 103a.

The operation of the three-dimensional model generating apparatus according to the first embodiment of the present invention will now be described by reference to FIGS. 1 and 2. FIG. 2 is a flowchart showing operation of the three-dimensional model generating apparatus according to the first embodiment of the present invention.

Figure 3A:
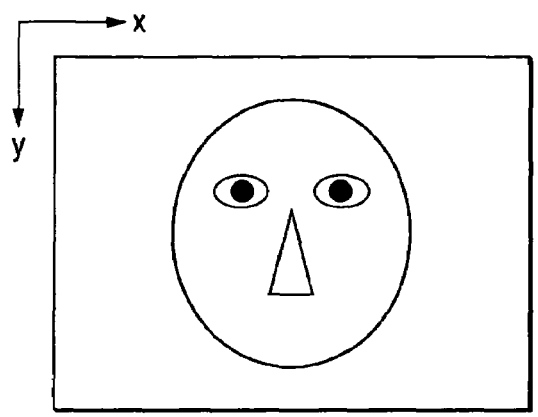
FIGS. 3A and 3B show an example set of input images of the first embodiment of the present invention.
Figure 3B:
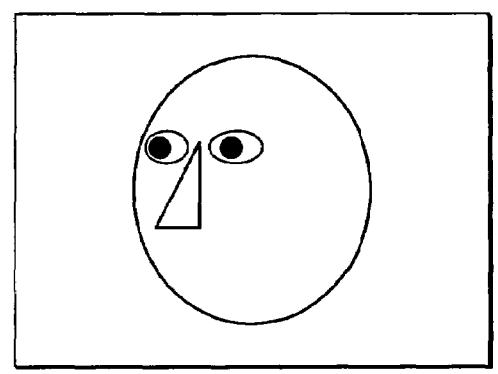
Figure 4C:
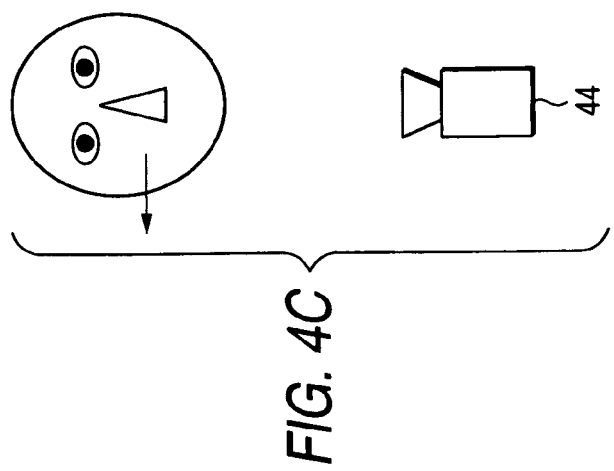
FIGS. 4A to 4C are views showing an example method for photographing an input image of the first embodiment of the present invention.
Figure 4B:
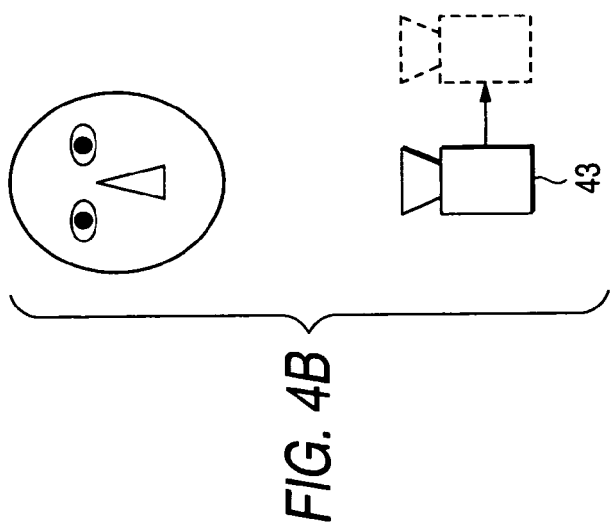
Figure 4A:
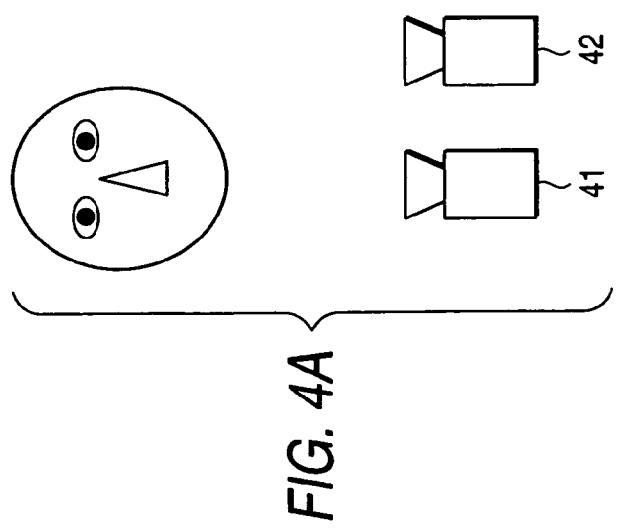

A plurality of images acquired by photographing a human face whose three-dimensional model is to be generated are input by the image input section 102 (step S101). Here, as shown in FIGS. 3A and 3B, the images, which are about to be input, are assumed to be acquired by photographing the human face from the front (FIG. 3A) and from the left (FIG. 3B). As shown in, e.g., FIG. 4A, a set of such images (called as a "stereo image") can be obtained by photographing the human face through use of two horizontally-installed cameras (41, 42). As shown in FIG. 4B, the stereo image can also be obtained by photographing the face from the front through use of one camera (43) and again photographing the face after the camera is moved. As shown in FIG. 4C, the stereo image can also be obtained by photographing the face from the front through use of one camera (44) and again photographing the face after the face, which is a subject of photographing, is moved.

The image input by the image input section 102 is transmitted to the vertex correspondence section 103.

In the vertex correspondence section 103, the feature vertex correspondence section 103a detects coordinates (x,y) of a point corresponding to the feature vertex on the standard model of the face stored in the vertex coordinate storage section 101, from the reference image selected from the images input by the image input section 102 (step S102). Next, the coordinate interpolation section 103b determines the coordinates (x,y) of the point corresponding to vertex on the standard model other than the feature vertices by interpolating the coordinates (x,y) of the point detected in step S102 (step S103). Here, the reference image is assumed to be acquired by photographing the face from the front so that the pose of the face in the reference image coincides with that of the standard model.

The standard model of the human face is stored in the vertex coordinate storage section 101 along with the three-dimensional coordinates (X,Y,Z) of the vertex on the standard model. Of the vertices on the standard model, the feature vertices are also stored in the vertex coordinate storage section 101. The feature vertices refer to predetermined vertices that represent the characteristics of the human face; e.g., the eyes, the nose, nasal cavities, the mouth, and the like.

The operations of the individual sections of the vertex correspondence section 103 will now be described.

The feature vertex correspondence section 103a detects the coordinates (x,y) of points on the reference image corresponding to the feature vertices on the standard model. For instance, a method with a separability filter utilizing dispersion of brightness of a reference image (see, e.g., Japanese Patent No. 3,490,482) can be used for detecting the coordinates (x,y) of a point on the reference image corresponding to the feature vertex on the standard model. Alternatively, coordinates of feature points can be manually specified.

By means of interpolation technique, the coordinate interpolation section 103b determines two-dimensional coordinates of points corresponding to vertices on the standard model other than the feature vertices from the coordinate of the points detected by the feature vertex correspondence section 103a. The term "vertices on the standard model other than the feature vertices" refers to vertices set on, e.g., the cheeks or the forehead of the face. We call them "non-feature vertices".

For example, we can employ an interpolation method to linearly interpolate two-dimensional coordinates a point on the reference image corresponding to a non-feature vertex, on the basis of coordinates of the feature vertices around the non-feature vertex and coordinates of points on the reference image corresponding to the feature vertices.

First, for each non-feature vertex on the standard model N feature vertices on the standard model are selected in ascending sequence of distance between the non-feature vertex and a feature vertex. Here, XY coordinates of the selected i-th feature vertices are denoted by $(X_i, Y_i)$. Further, the coordinates of the point on the reference image corresponding to the feature vertex are represented by $(x_i, y_i)$. The weighted sum of differences between the XY coordinates of the feature vertex and the coordinates of the point on the reference image, which is denoted by (dx,dy), is determined in accordance with Eq. (1).

$$dx = \sum_{i=1}^{N} w_i \cdot (x_i - X_i) \quad (1)$$

$$dy = \sum_{i=1}^{N} w_i \cdot (y_i - Y_i)$$

Here, $w_i$ designates a coefficient determined on a basis of a distance between the non-feature vertex on the standard model and the feature vertex on the standard model. All that is needed is to set $w_i$ so as to be a greater value as the distance becomes shorter.

Here, we denote the XY coordinates of the non-feature vertex on the standard model to be interpolated by $(X_T, Y_T)$. Then, the coordinates $(X_T, Y_T)$ of a point on the reference image corresponding to the vertex are given by Eq. (2).

$$x_T = X_T + dx$$

$$y_T = Y_T + dy \quad (2)$$

In the previously-described example, N feature vertices on the standard model are selected in ascending sequence of distance between the non-feature vertex and the feature vertex for each of non-feature vertices on the standard model, and by using thus-selected feature vertices the coordinates of the corresponding point to the vertex to be interpolated is linearly interpolated. However, it is not only the case. For example, we set a threshold value of the distance between the vertex to be interpolated and the feature vertex to be used for interpolation in advance, and then all feature vertices with the distance shorter than the threshold value can be used for linear interpolation.

When the number of feature vertices is small, there may be used, e.g., an interpolation method using a two-dimensional spline (see, e.g., Yukio Oonishi, "Surface Interpolation by a Spline Technique," Journal of the Oceanographical Society of Japan, Vol. 31, pp. 259-264, 1975).

The coordinates (x,y) of points on the reference image corresponding to vertices on the standard model detected by the vertex correspondence section 103 are sent to a corresponding point detection section 104.

The corresponding point detection section 104 detects coordinates (x',y') of points corresponding to the point detected by the vertex correspondence section 103, from an image other than the reference image, input by the image input section 102 (step S104). As a method for detecting a point on another image corresponding to the pint on the reference image is illustrated in FIGS. 5A and 5B: set an area (window) of a given size centered on a point on the reference image; search for a window on another image where a distribution of brightness is the most similar with the distribution of brightness in the window of the reference image; and take a point in the center of the obtained window as a point corresponding to the point on the reference image. When the reference image and the other image are photographed through use of horizontally-installed two cameras, it is enough to find a corresponding point on the other image only by searching x' along the line where y'=y.

The coordinates (x,y) of the thus-detected point on the reference image and the coordinates (x',y') of the corresponding point on the other image are then delivered to the depth computation section 105.

Figure 6:
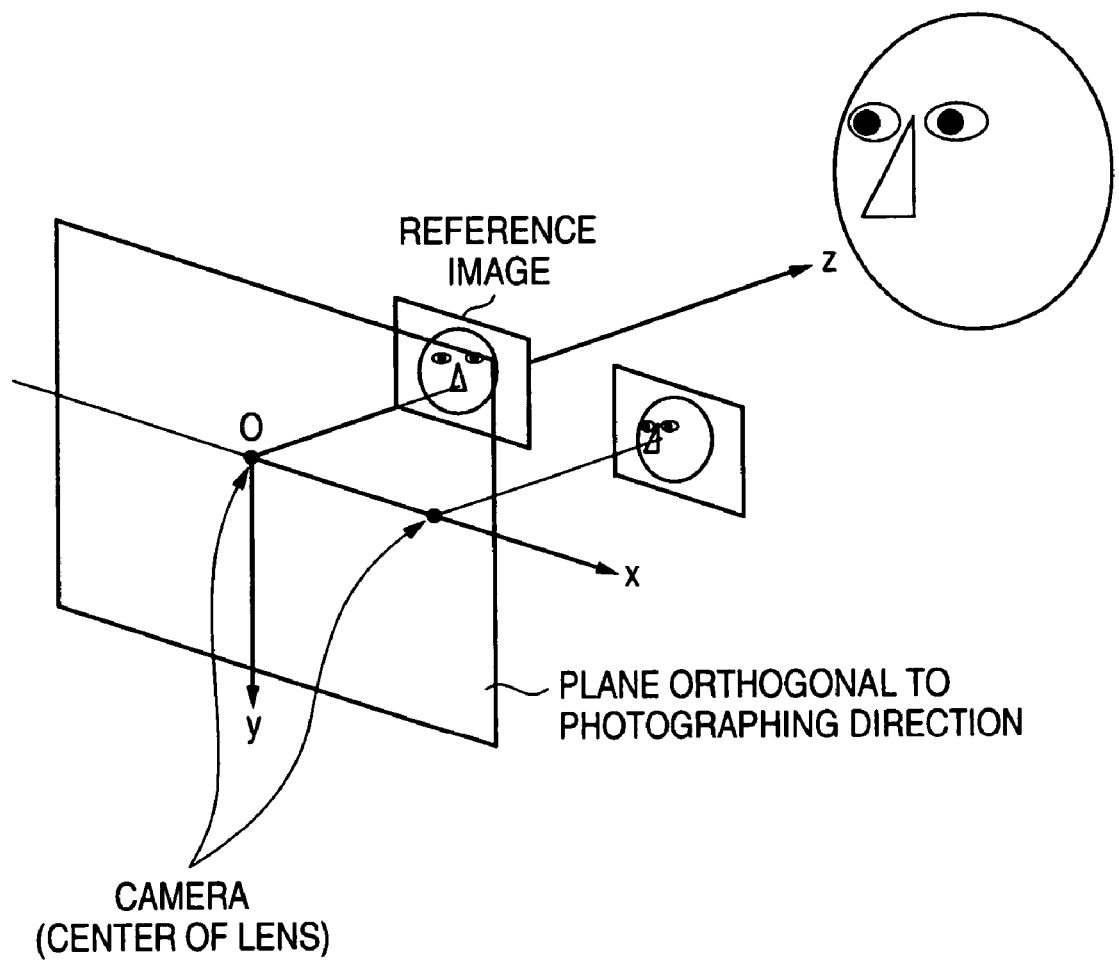
FIG. 6 is a view showing the depth of points on the reference image of the first embodiment of the present invention.

From the coordinates (x,y) of the point on the reference image and the coordinates (x',y') of the corresponding point on the other image, the depth computation section 105 computes a depth z of the point on the reference image through use of the stereo method. Now, as shown in FIG. 6, the depth z of the point on the reference image is a distance from the plane, which is orthogonal to the photographing direction and passes the center point of the lens of the camera to a point on the face corresponding to the point on the reference image. Here, the term "stereo method" means a method for determining, from at least two stereo images, the three-dimensional shape of an object included in the stereo images or a location (a depth or the like) where the object is positioned, by use of the principle of triangulation.

Movement of the camera used for acquiring a stereo image is not limited to the horizontal direction but may include the vertical direction or an oblique direction made by merging the horizontal direction and the vertical direction. Moreover, a stereo image may be acquired by rotating a subject of photographing and photographing a plurality of images of the subject. Here, rotation around a line connecting the camera to the subject of photographing is excluded from the rotational movement. Moreover, a stereo image is not limited to a set of two images. In the present invention, a set of plural images can be available.

When the depth of a point in a three-dimensional space is determined from coordinates of corresponding points in two images through use of the stereo method; for example, when the reference image and the other image are photographed by use of the two horizontally-installed cameras as mentioned previously, the depth z can be determined according to Eq. (3) on the assumption that the distance between the center points of the lenses of the two cameras is taken as B and that the focal distance of the lens of each camera is taken as F.

$$z = \frac{B \cdot F}{|x - x'|} \quad (3)$$

The depth z of the point on the reference image computed by the depth computation section 105 is now sent to the vertex coordinate updating section 106.

The vertex coordinate updating section 106 updates three-dimensional coordinates (X,Y,Z) of the vertex on the standard model of the face stored in the vertex coordinate storage section 101. For each vertex on the standard model the coordinates are updated according to Eq. (4).

$$X_i = \frac{x_i \cdot B}{|x_i - x'_i|}$$
$$Y_i = \frac{y_i \cdot B}{|y_i - y'_i|}$$
$$Z_i = z_i,$$
(4)

where $(X_i, Y_i, Z_i)$ denotes the three-dimensional coordinates of the i-th vertex; $(x_i, y_i)$ denotes the coordinates of a point on the reference image corresponding to the i-th vertex; $(x'_i, y'_i)$ denotes the coordinates of a point on another image corresponding to the i-th vertex; and $z_i$ denotes the depth of a point on the reference image corresponding to the i-th vertex.

By updating the three-dimensional coordinates (X,Y,Z) of the vertex on the standard model, as mentioned above, the standard model of the face can be converted into a three-dimensional model corresponding to the face appearing in the two images input by the image input section 102.

By generating a texture image, e.g., from the reference image on the basis of the correspondence acquired in the vertex correspondence section 103, and mapping on the thus-generated three-dimensional model, a color or nature of the surface can also be added to the three-dimensional model. Moreover, so long as three-dimensional models of different people are generated by the present invention, a texture image generated from the image of one person's face can also be mapped to the three-dimensional model of an other person's face.

As mentioned above, according to the three-dimensional model generating apparatus of the first embodiment, correspondence of the vertex on the standard model of the face to the point on the reference image is determined on a two-dimensional plane. Next, the depth of the corresponding point on the reference image is determined through use of the stereo method. Therefore, even when the correspondence between the vertex and the point on the two-dimensional plane is erroneous, the coordinates of the depth of the point can be accurately determined by use of the stereo method. A model accurately representing the geometry of the actual face is achieved. Consequently, compared with a three-dimensional model generated by usual methods in which depths for some of vertices are determined by interpolation in the three-dimensional space, a three-dimensional model generated by the present invention can have superior accuracy in depth.

The above-mentioned embodiment is described on the assumption that the subject of generation of a three-dimensional model is a human face. However, the subject of generation of a three-dimensional model is not limited to a human face. For instance, a subject may be a vehicle, a set of eyeglasses, a teapot, or a television set. In such a case, for instance, characteristic three-dimensional points, such as mirrors or window frames of a vehicle, are determined in advance as feature vertices. Then the present invention is applicable.

This three-dimensional model generating apparatus can be implemented by use of, e.g., a general-purpose computer system as basic hardware. Specifically, the image input section 102, the vertex correspondence section 103, the corresponding point detection section 104, the depth computation section 105, and the vertex coordinate updating section 106 can be implemented by causing a processor set in the computer system to execute a program. In this case, the three-dimensional model generating apparatus may also be embodied by previously installing the program in the computer system, or by recording the program on a recording medium, such as a CD-ROM, or by distributing the program over a network and installing the program in the computer system as required. The vertex coordinate storage section 101 can be embodied by utilization of built-in memory of the computer system or external memory attached to the computer system or a storage medium, such as a hard disk drive, a CD-R, a CD-RW, a DVD-RAM, or a DVD-R, as appropriate.

Second Embodiment

In the first embodiment, the image captured by photographing the face from the front, among the images input by the image input section 102, is taken as the reference image.

The second embodiment describes an embodiment in the case where an image captured by photographing an inclined face is taken as a reference image. First, the pose of the face of the standard model is changed so as to coincide with the pose of the face appearing in the reference image, and then a vertex on the thus-changed standard model is associated with a point on the reference image.

Figure 7:
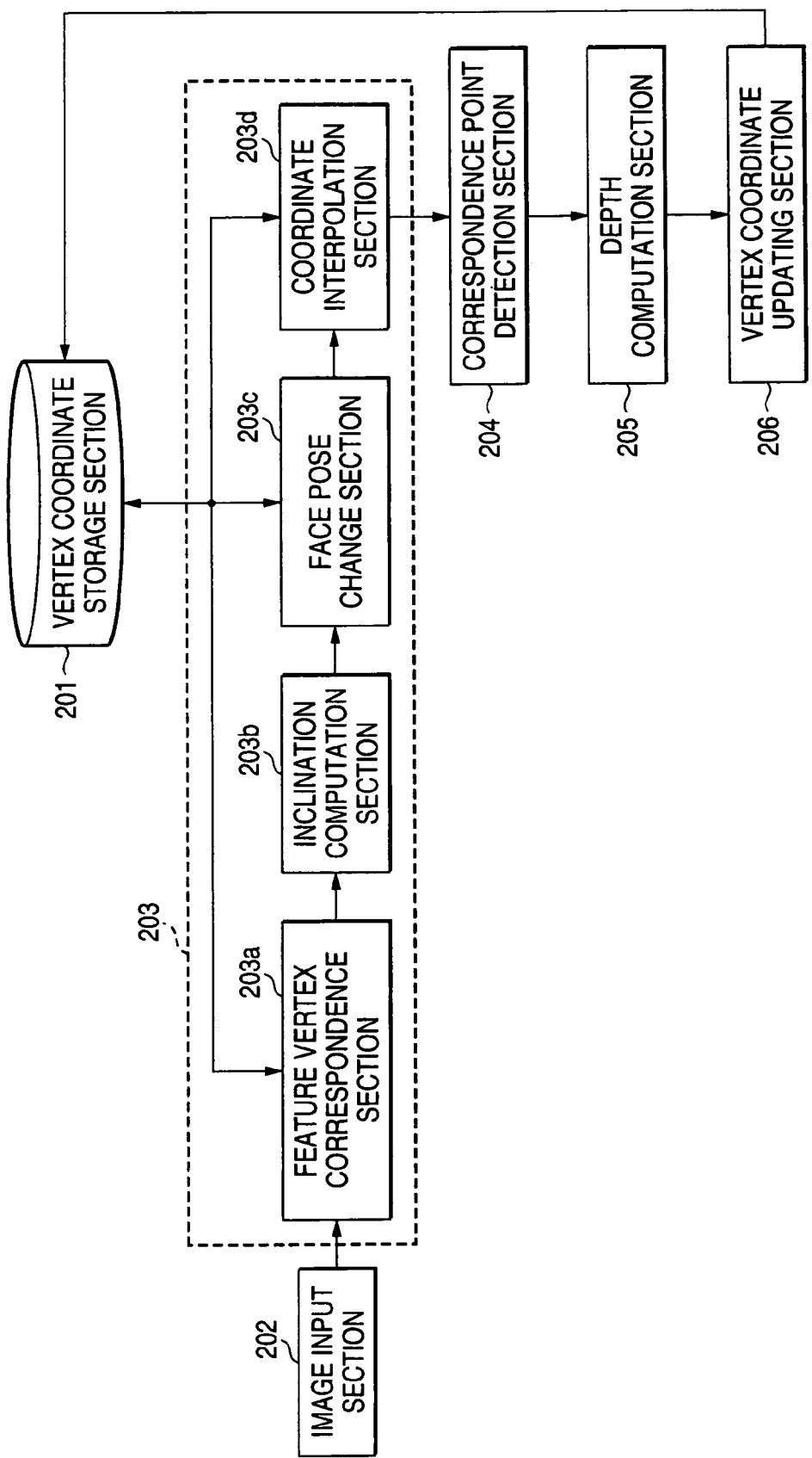
FIG. 7 is a block diagram showing the configuration of a three-dimensional model generating apparatus according to a second embodiment of the present invention.

FIG. 7 is a block diagram showing a three-dimensional model generating apparatus according to a second embodiment of the present invention.

The three-dimensional model generating apparatus of the second embodiment comprises a vertex coordinate storage section 201 for storing a standard model of a human face along with three-dimensional coordinates (X,Y,Z) of vertices on the standard model; an image input section 202 for inputting a plurality of images captured by photographing the human face whose three-dimensional model is to be generated; a vertex correspondence section 203 for detecting, from the reference image selected from the images input by the image input section 202, coordinates (x,y) of a point corresponding to the vertex on the standard model stored in the vertex coordinate storage section 201; a corresponding point detection section 204 for detecting, from an image other than the reference image, input by the image input section 202, coordinates (x',y') of a point corresponding to the point on the reference image detected by the vertex correspondence section 203; a depth computation section 205 for computing the depth of the point on the reference image from the coordinates (x,y) of the point on the reference image detected by the vertex correspondence section 203 and the coordinates (x',y') of the corresponding point on the other image detected by the corresponding point detection section 204; and a vertex updating section 206 for updating coordinates (X,Y,Z) of the vertex on the standard model of the object on the basis of the depth of the point on the reference image computed by the depth computation section 205.

The vertex correspondence section 203 comprises a feature vertex correspondence section 203a for detecting, from the reference image, coordinates (x,y) of a point corresponding to a predetermined characteristic vertex (a feature vertex) among vertices stored in the vertex coordinate storage section 201; an inclination computation section 203b for computing an inclination between the pose of the face appearing in the reference image and the pose of the face of the standard model, from the coordinates (x,y) of the point on the reference image detected by the feature vertex correspondence section 203a and the coordinates (X,Y,Z) of the feature vertex on the standard model; a face pose change section 203c for updating three-dimensional coordinates of the vertex on the standard model on the basis of the inclination computed by the inclination computation section 203b such that the pose of the face of the standard model coincides with the pose of the face appearing in the reference image; and a coordinate interpolation section 203d for determining, through interpolation, the coordinates (x,y) of the point corresponding to a vertex on the standard model changed other than the feature vertex by the face pose change section 203c, from the coordinates (x,y) of the point on the reference image detected by the feature vertex correspondence section 203a.

The second embodiment differs from the first embodiment in terms of the orientation of the face appearing in the image input by the image input section 202 and the operation of the vertex correspondence section 203. Therefore, explanations of sections which operate in the same manner as those in the first embodiment (the corresponding point detection section 204, the depth computation section 205, and the vertex coordinate update section 206) are omitted.

Figure 8:
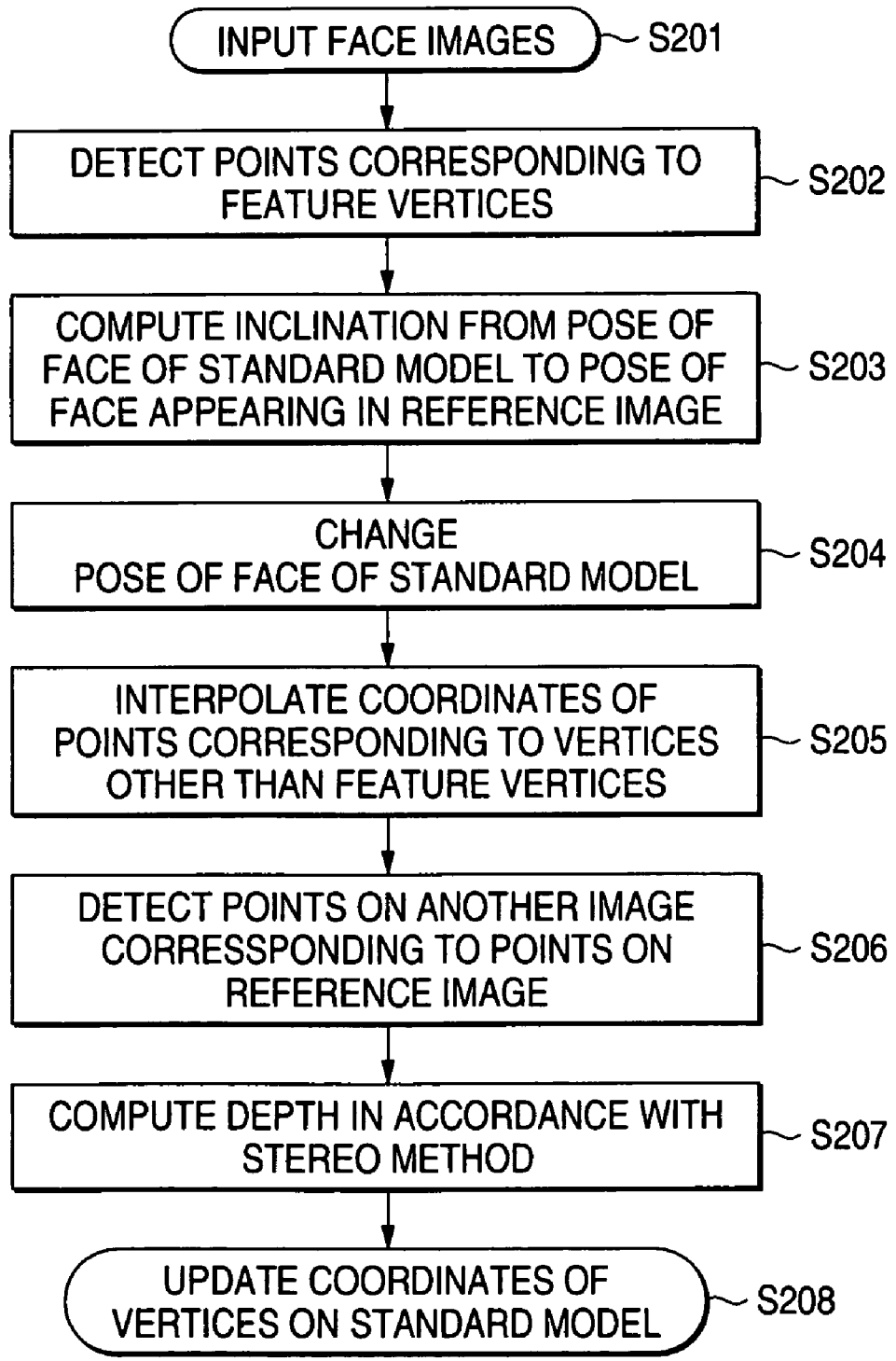
FIG. 8 is a flowchart showing operation of the three-dimensional model generating apparatus according to the second embodiment of the present invention.

Operation of the three-dimensional model generating apparatus of the second embodiment of the present invention will now be described by reference to FIGS. 7 and 8. FIG. 8 is a flowchart showing the operation of the three-dimensional model generating apparatus of the second embodiment of the present invention.

Figure 9A:
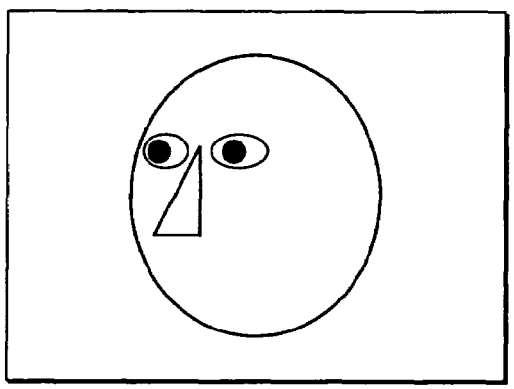
FIGS. 9A and 9B are views showing an example set of input images of the second embodiment of the present invention.
Figure 9B:
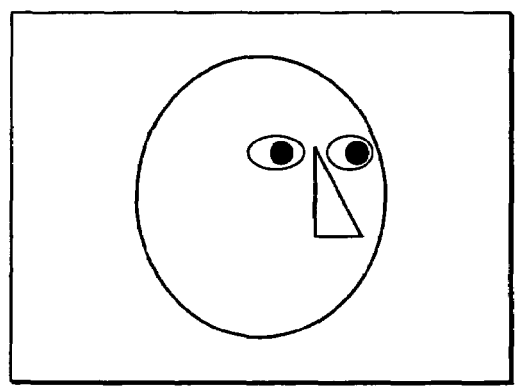

First, a plurality of images captured by photographing a human face whose three-dimensional image is to be generated are input by the image input section 202 (step S201). The input images shown in FIGS. 9A and 9B include an image (FIG. 9A) captured by photographing the human face from the left and the image (FIG. 9B) captured by photographing the human face from the right, and the image shown in FIG. 9A is used as the reference image herein below for explanation.

The image input by the image input section 202 is then sent to the vertex correspondence section 203.

In the vertex correspondence section 203, the feature vertex correspondence section 203a first detects, from the reference image selected from the images input by the image input section 102, the coordinates (x,y) of the point corresponding to a feature vertex on the standard model of the face stored in the vertex coordinate storage section 201 (step S202).

As mentioned previously, for instance, a method with a separability filter utilizing dispersion of brightness of a reference image can be available for detecting the coordinates (x,y) of the point on the reference image corresponding to the feature vertex on the standard model.

Next, the inclination computation section 203b computes an inclination between the pose of the face appearing in the reference image and the pose of the face of the standard model, through use of the coordinates (X,Y,Z) of the feature vertex on the standard model and the coordinates (x,y) of the corresponding point on the reference image detected by the feature vertex correspondence section 203a (step S203). Here, the inclination between the pose of the face appearing in the reference image and the pose of the face of the standard model refers to a rotational matrix R which rotates the coordinates (X,Y,Z) of the vertex on the standard model so the pose of the standard model coincides with the pose of the face appearing in the reference image. For instance, a method disclosed in JP-A-2003-141552 can be used as a method for determining such a rotational matrix R from the three-dimensional coordinates (X,Y,Z) of the feature vertex of the standard model of the face and the coordinates (x,y) of the corresponding point on the reference image.

The thus-computed rotational matrix R is then sent to the face pose change section 203c.

The face pose change section 203c updates the three-dimensional coordinates (X,Y,Z) of the vertex on the standard model such that the pose of the face of the standard model coincides with the pose of the face appearing in the reference image (step S204). More specifically, the three-dimensional coordinates (X,Y,Z) of the vertex on the standard model is updated according to Eq. (5) through use of the rotational matrix R sent from the inclination computation section 203b.

$$\begin{bmatrix} X' \\ Y' \\ Z' \end{bmatrix} = R \begin{bmatrix} X \\ Y \\ Z \end{bmatrix}, \quad (5)$$

where the coordinates (X',Y',Z') represent the updated three-dimensional coordinates of the vertex on the standard model.

The coordinate interpolation section 203d determines, the coordinates of the point corresponding to a vertex other than the feature vertex on the standard model through interpolation by using the three-dimensional coordinates (X',Y',Z') of the feature vertex on the standard model whose face pose is changed and the coordinates (x,y) of the point on the reference image corresponding to the feature vertex on the standard model detected by the feature vertex correspondence section 103a. We can use the interpolation method analogous to that employed by the coordinate interpolation section 103b of the above-described first embodiment.

The coordinates (x,y) of the point on the reference image that is detected by the vertex correspondence section 203 are then sent to the corresponding point detection section 204. The corresponding point detection section 204 detects a point corresponding to the point on the reference image detected by the vertex correspondence section 203 from the other image input by the image input section 202. The depth computation section 205 computes the depth of the point on the reference image from the coordinates of the points on the reference image and on the other image. According to Eq. (4), the vertex coordinate update section 206 updates the coordinates of the vertex, thereby generating the three-dimensional model of the face appearing in the images input by the image input section 202.

As mentioned above, according to the three-dimensional model generating apparatus of the second embodiment, even when the image of the face input by the image input section 202 is not the image captured by photographing the face from the front a highly-accurate three-dimensional model can be generated. That is because the inclination of the standard model of the face is changed so that the pose of the face of the standard model coincides with the pose of the face appearing in the image before correspondence detections and depth computation.

The present invention is not limited directly to the above-described embodiments and can be embodied by changing constituent elements within the scope of the invention in the stage of implementation. Further, various inventions can be created by appropriate combinations of a plurality of constituent elements described in the embodiments. For example, some constituent elements may be deleted from all the constituent elements described in the embodiments. In addition, the constituent elements of different embodiments may be combined together as appropriate.

What is claimed is:

1. An apparatus for generating a three-dimensional model of an object, comprising:
   a storage unit that stores three-dimensional coordinates (X,Y,Z) of a plurality of vertices on a standard model of the object;
   an image input unit that inputs a plurality of input images acquired by photographing the object;
   a first detection unit that detects a coordinate (x,y) of a first point corresponding to a vertex on the standard model, from a first image selected from among the plurality of input images;
   a second detection unit that detects a coordinate (x',y') of a second point corresponding to the coordinate of the first point on the first image, from a second image other than the first image, input by the image input unit;
   a depth computation unit that computes a depth of the first point on the first image by using the coordinate (x,y) of the first point on the first image and the coordinate (x',y') of the second point on the second image; and
   a first update unit that updates the three-dimensional coordinate (X,Y,Z) on the standard model based on the coordinate (x,y) of the first point on the first image and the depth calculated by the depth computation unit,
   wherein the first detection unit includes an interpolation unit that computes the coordinate (x,y) of the first point on the first image by interpolation using coordinates (x",y") of third points on the first image corresponding to predetermined vertices on the standard model and using three-dimensional coordinates (X',Y',Z') of the predetermined vertices on the standard model.

2. The apparatus according to claim 1, wherein the depth computation unit computes the depth of the first point on the first image in accordance with a stereo method using the coordinate (x,y) of the first point on the first image and the coordinate (x',y') of the second point on the second image.

3. The apparatus according to claim 1, wherein the first detection unit includes:
   an inclination computation unit that computes a difference of inclinations between the standard model and the object included in the first image by using coordinates (x",y") of third points on the first image corresponding to predetermined vertices on the standard model and using three-dimensional coordinates (X',Y',Z') of the predetermined vertices on the standard model;
   a second updating unit that updates three-dimensional coordinates of the standard model, based on the difference of the inclinations, such that the difference of the inclinations of the standard model is smaller than a threshold; and
   an interpolation unit that calculates the coordinate (x,y) of the first point on the first image by interpolation using the coordinates (x",y") of the third points on the first image corresponding to the predetermined vertices on the standard model and using the three-dimensional coordinates (X",Y∴,Z") of the predetermined vertices on the updated standard model.

4. A method for generating a three-dimensional model of an object, comprising:
   an image input step of inputting a plurality of input images acquired by photographing the object;
   a first detection step of detecting a coordinate (x,y) of a first point corresponding to a vertex on a standard model, from a first image selected from among the plurality of input images;
   a second detection step of detecting a coordinate (x',y') of a second point corresponding to the coordinate of the first point on the first image, from a second image other than the first image, input in the image input step;
   a depth computation step of computing a depth of the first point on the first image by using the coordinate (x,y) of the first point on the first image and the coordinate (x',y') of the second point on the second image; and
   a first update step of updating the three-dimensional coordinate (X,Y,Z) of the standard model based on the coordinate (x,y) of the first point on the first image and the depth calculated in the depth computation step,
   an interpolation step of computing the coordinate (x,y) of the first point on the first image by interpolation using coordinates (x",y") of third points on the first image corresponding to predetermined vertices on the standard model and using three-dimensional coordinates (X',Y',Z) of the predetermined vertices on the standard model.

5. The three-dimensional model generating method according to claim 4, wherein the depth computation step is for computing the depth of the first point on the first image in accordance with a stereo method using the coordinate (x,y) of the first point on the first image and the coordinate (x',y') of the second point on the second image.

6. A computer readable medium storing a program to make a computer perform generating a three-dimensional model of an object, the program comprising:
   an image input step of inputting a plurality of input images acquired by photographing the object;
   a first detection step of detecting a coordinate (x,y) of a first point corresponding to a vertex on a standard model, from a first image selected from among the plurality of input images;
   a second detection step of detecting a coordinate (x',y') of a second point corresponding to the coordinate of the first point on the first image, from a second image other than the first image, input in the image input step;
   a depth computation step of computes a depth of the first point on the first image by using the coordinate (x,y) of the first point on the first image and the coordinate (x',y') of the second point on the second image; and
   an update step of updating the three-dimensional coordinate (X,Y,Z) of the standard model on based on the coordinates (x,y) of the first point on the first image and the depth calculated in the depth computation step,
   wherein the first detection step includes: an interpolation step of computing the coordinate (x,y) of the first point on the first image by interpolation using coordinates (x",y") of third points on the first image corresponding to predetermined vertices on the standard model and using three-dimensional coordinates (X',Y',Z') of the predetermined vertices on the standard model.

7. The storage medium according to claim 6, wherein the depth computation step is for computing the depth of the first point on the first image in accordance with a stereo method using the coordinate (x,y) of the first point on the first image and the coordinate (x',y') of the second point on the second image.

* * * * *